US007802030B2

(12) United States Patent
Otsuji

(10) Patent No.: US 7,802,030 B2
(45) Date of Patent: Sep. 21, 2010

(54) INTERRUPT GENERATION CIRCUIT FOR INTERMEDIATE RESPONSE TO EDGE DETECTION SIGNAL, WHEN COUNT VALUE OF MAIN TIMER IS LESS THAN PRE-STORED VALUE

(75) Inventor: Takashi Otsuji, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 581 days.

(21) Appl. No.: 11/136,385

(22) Filed: May 25, 2005

(65) Prior Publication Data

US 2005/0267668 A1 Dec. 1, 2005

(30) Foreign Application Priority Data

May 27, 2004 (JP) ............................ 2004-157731

(51) Int. Cl.
*G06F 3/00* (2006.01)
*G06F 5/00* (2006.01)
*G06F 19/00* (2006.01)
*G06G 7/70* (2006.01)

(52) U.S. Cl. ........................................ 710/48; 701/101

(58) Field of Classification Search .................... 710/48
See application file for complete search history.

(56) References Cited

U.S. PATENT DOCUMENTS 4,177,516 A * 12/1979 Mason ....................... 701/101
4,617,679 A * 10/1986 Brooks ....................... 375/374
5,926,333 A * 7/1999 Bang ........................... 360/51
5,928,366 A * 7/1999 Kawasaki ................... 713/601
6,278,934 B1 * 8/2001 Yoon .......................... 701/111
6,487,246 B1 * 11/2002 Hoeld ........................ 375/238
2005/0213654 A1 * 9/2005 Figoli ......................... 375/238
2007/0230559 A1 * 10/2007 Kris et al. .................. 375/238

FOREIGN PATENT DOCUMENTS

JP 11334937 * 6/1999

* cited by examiner

*Primary Examiner*—Alford W Kindred
*Assistant Examiner*—Brooke J Dews
(74) *Attorney, Agent, or Firm*—Foley & Lardner LLP

(57) ABSTRACT

The present invention provides an interrupt generation circuit that can reduce the time between the moment a monitored object actually enters a desired state and the moment an interrupt is generated. An external event detection unit 101 detects the effective edge of an external event signal. A count period generation circuit 103 generates external event division signals which are counted by the main timer 104 and each of which has a period that is 1/N of the time interval between the effective edges of the immediately preceding external event signal. A compare register 105 stores a value corresponding to the time at which an interrupt is to be generated. When the count value of the main timer 104 becomes equal to or larger than the value stored in the compare register 105, the interrupt determination circuit 106 generated an interrupt. If the count value of the main timer 104 is smaller than the value stored in the compare register 105 when the effective edge is detected, the interrupt determination circuit 106 immediately generates an interrupt.

16 Claims, 4 Drawing Sheets

INTERRUPT GENERATION CIRCUIT FOR INTERMEDIATE RESPONSE TO EDGE DETECTION SIGNAL, WHEN COUNT VALUE OF MAIN TIMER IS LESS THAN PRE-STORED VALUE

FIELD OF THE INVENTION

The present invention relates to an interrupt generation circuit, and more particularly to an interrupt generation circuit that, based on a periodic external signal received from an object to be monitored (termed as "monitored object" in the present invention), generates an interrupt when the monitored object is estimated to enter a desired state.

BACKGROUND OF THE INVENTION

For example, the crank of an engine has a crank sensor that periodically generates a pulse at each predetermined angle, and the signal from that crank sensor is used for controlling the engine. When the crank sensor generates a pulse every 30 degrees, a crank angle in multiples of 30 degrees, that is, 0 degree, 30 degrees, 60 degrees, and so on, can be detected by the crank sensor. However, an intermediate crank angle, such as 15 degrees and 45 degrees, cannot be detected directly by this crank sensor. To detect an intermediate crank angle, an interrupt generation circuit is used that uses the signal from the crank sensor as an external signal from the monitored object to estimate the current crank angle and, when the crank angle is estimated to reach a desired angle, generates an interrupt.

FIG. 3 is a diagram showing the configuration of a conventional interrupt generation circuit that performs the operation described above, and FIG. 4 is a timing chart showing an example of the operation. The external event signal is a pulse signal generated periodically but not at a regular interval. The first pulse of the external event signal corresponds, for example, to the crank angle of 30 degrees, and the next pulse to the crank angle of 60 degrees. This interrupt generation circuit 200 measures time from a moment an effective edge (rising edge or falling edge) of an immediately preceding external event signal is detected to a moment an effective edge of the current external event signal is detected and, based on the measured time, estimates a period of time that will elapse from the moment the effective edge of the current external event signal is detected to a moment an effective edge of the next external event signal is detected. When the crank angle is thought to reach a desired position, the interrupt generation circuit generates an interrupt.

An external event detection unit 201 detects the effective edge of the external event signal and outputs an external event detection signal. The effective edge period of the external event signal becomes shorter as the rotations of the engine increases. A first sub-timer 202, which receives a clock signal, counts the pulses of the clock signal from the time the effective edge of the external event signal is detected by the external event detection unit 201 to the time the effective edge of the next external event signal is detected.

The count value stored in the first sub-timer 202 when the external event detection unit 201 detects the effective edge of the external event signal corresponds to a period of time from a moment an immediately preceding effective edge of the external event signal is detected to a moment a current effective edge is detected. Based on the timer value, which is stored in the first sub-timer 202 when the external event detection unit 201 detects the effective edge of the external event signal, and the preset number N, a count period generation circuit

203 generates an external event division signal having N pulses. The period of each of N pulses is equal to 1/N of the effective edge period.

The external event division signal is counted by a second sub-timer 204 and a main timer 205. Because the external event division signal has a period equal to 1/N of the time interval of an immediately preceding external event signal, a period of time required from the moment the second sub-timer 204 and the main timer 205 start counting pulses of the external event division signal to the moment the N pulses are counted indicates the time interval of the period of the immediately preceding external event. If the time interval of the current external event period equals the time interval of the immediately preceding external event period, the count value stored in the main timer 205 corresponds to a crank rotation angle that has advanced from the moment the pulse of the external event signal is generated. For example, if the count value of the main timer 205 is N/2, it indicates that the crank angle at this time is 15 degrees advanced from the moment the pulse of the external event signal is generated.

A compare register 206 stores a desired value corresponding to a crank angle at which an interrupt is to be generated. If the count value stored in the main timer 205 equals the value stored in the compare register 206 in which a desired value is stored, the interrupt generation circuit 200 immediately generates a compare interrupt (signal). For example, if "N/2" is stored in the compare register 206 after the pulse of the external event signal indicating the crank angle of 30 degrees is generated, the interrupt generation circuit 200 generates an interrupt when the count value of the main timer 205 reaches "N/2" and the crank angle estimated from the count value reaches 45 degrees.

When the time interval of the current external event period is shorter than the time interval of the immediately preceding external event period, the external event detection unit 201 detects an effective edge of the next external event signal before a count value stored in the main timer 205 and the second sub-timer 204 reaches a maximum value. If the main timer 205 is cleared at the same time the second sub-timer 204 is cleared when an effective edge of the external event signal is detected, the count value stored in the main timer 205 cannot be made equal to a value stored in the compare register 206 and thus an interrupt cannot be generated at a crank angle at which an interrupt is to be generated. Therefore, this circuit is configured in such a way that the count value stored in the main timer 205 is cleared only when that the count reaches the maximum value.

The count value in the second sub-timer 204 is cleared to 0 when the effective edge of the pulse of the external event signal is detected. Therefore, if the effective edge of the pulse of the external event signal is detected before the count value of the main timer 205 reaches a maximum value, the count value of the second sub-timer 204 becomes not equal to the count value of the main timer 205. In this case, a high-level clock switching signal is input to a selector 207, and the clock signal that is a shortest-period pulse signal in the interrupt generation circuit 200 is input to the main timer 205 via the selector 207. This causes the main timer 205 to increase the count value quickly.

If the count value of the main timer 205 does not yet reach the value stored in the compare register 206 when the effective edge of the pulse of the external event signal is detected, the compare interrupt is not yet generated. If the main timer 205 counts the clock signals to increase the count value quickly and the count value of the main timer 205 becomes equal to the value stored in the compare register 206, the compare interrupt is generated immediately. The count value of the main timer 205 is increased to the maximum value and then the count value is cleared.

Even while the main timer 205 counts the clock signals, the second sub-timer 204 keeps counting the external event division signals generated by the count period generation circuit 203. If the count value of the main timer 205 becomes equal to the count value of the second sub-timer 204, the clock switching signal goes low and the main timer 205 restarts counting the external event division signals output from the count period generation circuit 203. The technology that uses the counters and the compare register described above is described, for example, in Non-Patent Document 1.

[Non-Patent Document 1]

SH-2E SH7058F-ZTAT Hardware Manual (Doc No. RJJ09B0019-0200H) 11-172 to 11-179 (pp. 378 to pp. 385)

SUMMARY OF THE DISCLOSURE

According to the conventional technology, if the effective edge of the pulse of the next external event signal is detected before the count value of the main timer 205 reaches the maximum value, the main timer 205 counts the shorter-period clock signals to increase the count value quickly as described above. In this case, the time required for the count value of the main timer 205 to become equal to the count value of the second sub-timer 204 and the time required for the count value of the main timer 205 to become equal to the value stored in the compare register 206 for generating a compare interrupt depend on the value of the main timer 205 that is stored when the effective edge of the external event signal is detected. Therefore, if the value stored in the compare register 206 is set close to the maximum value of the count value of the main timer 205, the time interval from the moment the crank angle becomes a rotation angle to be detected to the moment the compare interrupt is generated becomes indefinite and, as a result, the crank angle cannot be detected accurately by minimizing this time difference.

Accordingly, there is much to be desired in the art for an interrupt generation circuit that, based on a periodic external signal received from a monitored object, generates an interrupt when the monitored object enters a desired state, wherein the time difference between the moment the monitored object actually enters the desired state and the moment the interrupt is generated can be minimized.

According to an aspect of the present invention, there is provided an interrupt generation circuit comprises an edge detection unit that receives a periodic external signal from a monitored object and, upon detecting an effective edge of the external signal, generates an edge detection signal; a main timer that counts a pulse signal and, when the edge detection signal is generated, clears a count value; and an interrupt determination circuit that compares the count value of the main timer with a value stored in a compare register, in which a desired value is stored, for determining whether an interrupt is to be generated based on the comparison result. In the interrupt generation circuit, when the edge detection signal is generated, the interrupt determination circuit generates an interrupt at a timing when the edge detection signal is generated if the count value of the main timer is smaller than the value stored in the compare register.

The external signal is, for example, a signal from a sensor that generates a pulse for each predetermined angle of rotation. The value stored in the compare register is controlled by a value corresponding, for example, to a rotation angle to be detected. According to the interrupt generation circuit of the present invention, when the edge detection unit generates the next edge detection signal in case where the count value of the main timer is smaller than the value stored in the compare register, the interrupt determination circuit generates an interrupt immediately at this timing. The fact that the count value of the main timer is smaller than the value stored in the compare register when the edge detection unit generates the next edge detection signal means that the timing at which an interrupt should be generated has already has passed. Even in that case, the interrupt generation circuit of the present invention can generate an interrupt at a time when the edge detection signal is generated, thus making it possible to reduce the time difference from the moment the monitored object actually enters the desired state to the moment the interrupt is generated.

The interrupt generation circuit of the present invention can employ a configuration in which the interrupt determination circuit generates an interrupt when the count value of the main timer becomes equal to or larger than the value stored in the compare register in case a compare enable signal is active, wherein the compare enable signal is activated when the count value of the main timer is smaller than the value stored in the compare register, whereas the compare enable signal is deactivated when the count value of the main timer is equal to or larger than the value stored in the compare register. In this configuration, the pulse signal is counted to generate an interrupt when the count value of the main timer becomes equal to or larger than the value stored in the compare register.

Preferably, the interrupt generation circuit of the present invention further comprises a sub-timer that measures a time interval between a time when the edge detection signal is generated and a time when the next edge detection signal is generated; and a count signal generation circuit that generates the pulse signal and, when the edge detection signal is generated, sets a period of the pulse signal based on the time interval between the effective edges measured by the sub-timer and on a division ratio 1/N (N: an integer equal to or larger than 2). In this way, the time at which the interrupt generation circuit actually generates an interrupt can be made closer to the time at which the interrupt is to be generated.

The interrupt generation circuit of the present invention allows the division ratio 1/N to be set according to the time interval between the effective edges measured by the sub-timer.

When N is constant, the period of the pulse signal counted by the main counter becomes longer as the time interval between the effective edges is longer and, conversely, the period of the pulse signal counted by the main counter becomes shorter as the time interval between the effective edges is shorter. For example, when the time interval between the effective edges is long, N can be set to a large value to prevent the period of the pulse signal counted by the main timer from becoming too long. Conversely, when the time interval between the effective edges is short, N can be set to a small value to prevent the period of the pulse signal counted by the main timer from becoming too short.

The meritorious effects of the present invention are summarized as follows.

When the edge detection signal is generated, the interrupt determination circuit of the interrupt generation circuit of the present invention generates an interrupt at the same time the edge detection signal is generated in case where the count value of the main timer is smaller than the value stored in the compare register. Thus, the time difference between the moment a monitored object enters a desired state and a time at which an interrupt is generated can be reduced.

PREFERRED EMBODIMENTS OF THE INVENTION

Figure 1:
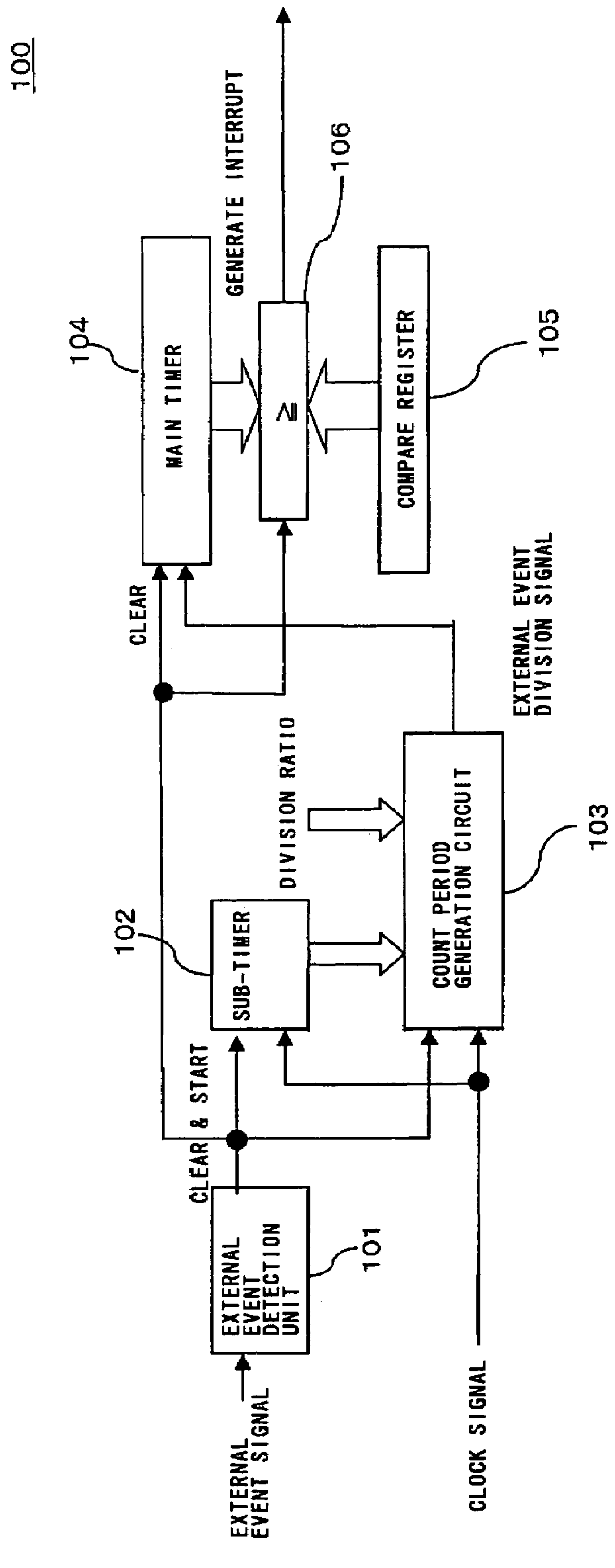
FIG. 1 is a block diagram showing the configuration of an interrupt generation circuit in one embodiment of the present invention.

The present invention will be described more in detail by way of an embodiment of the present invention with reference to the drawings. FIG. 1 is a diagram showing the configuration of an interrupt generation circuit in one embodiment of the present invention. This interrupt generation circuit 100 comprises an external event detection unit 101, a sub-timer 102, a count period generation circuit 103, a main timer 104, a compare register 105, and an interrupt determination circuit 106. The interrupt generation circuit 100 receives an external event signal from a sensor that generates a pulse for each predetermined moving distance or for each predetermined angle of rotation, and generates an interrupt when a desired moving distance or a desired angle of rotation angle is achieved from a time the pulse is generated.

Figure 2:
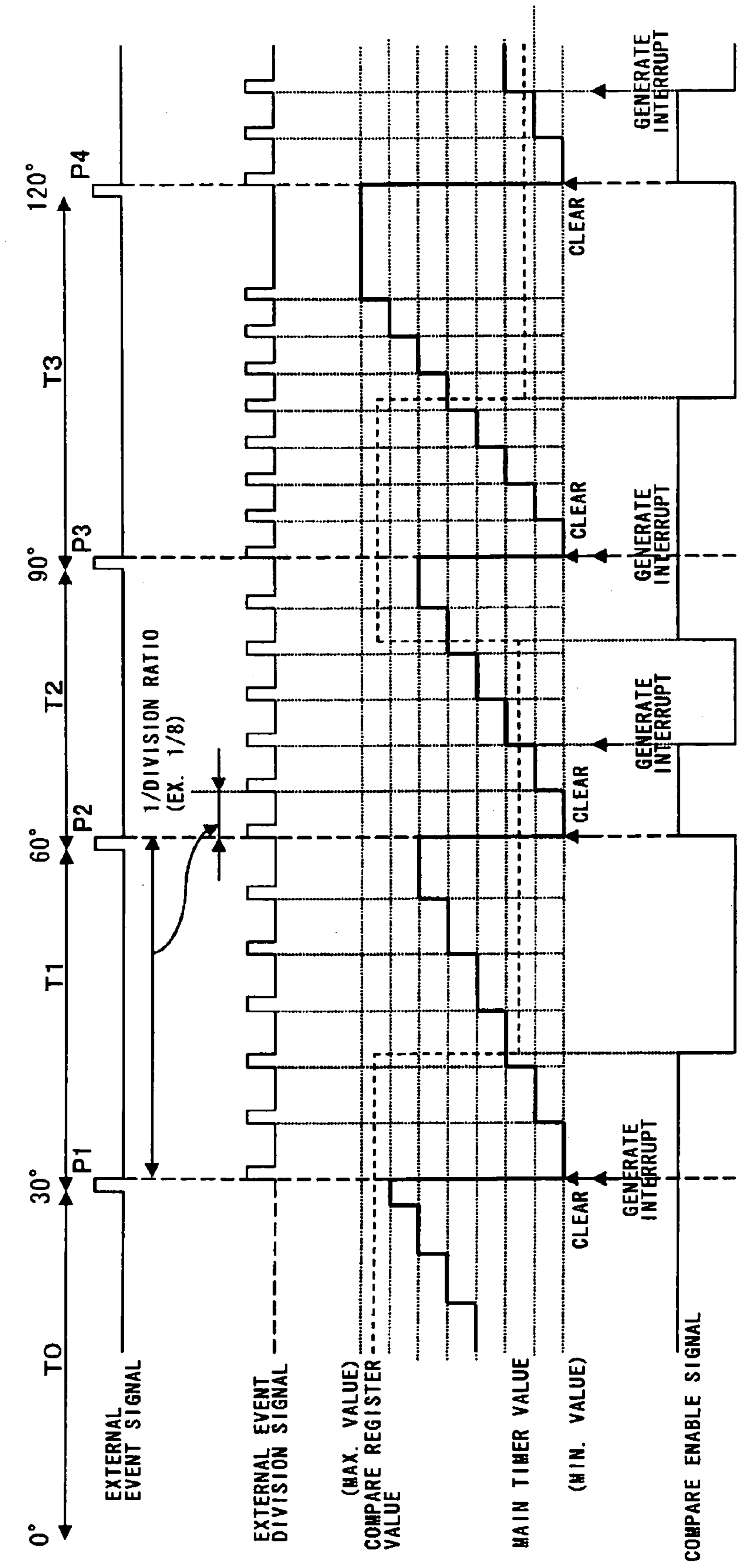
FIG. 2 is a timing chart showing the operation of the components of the interrupt generation circuit.
Figure 3:
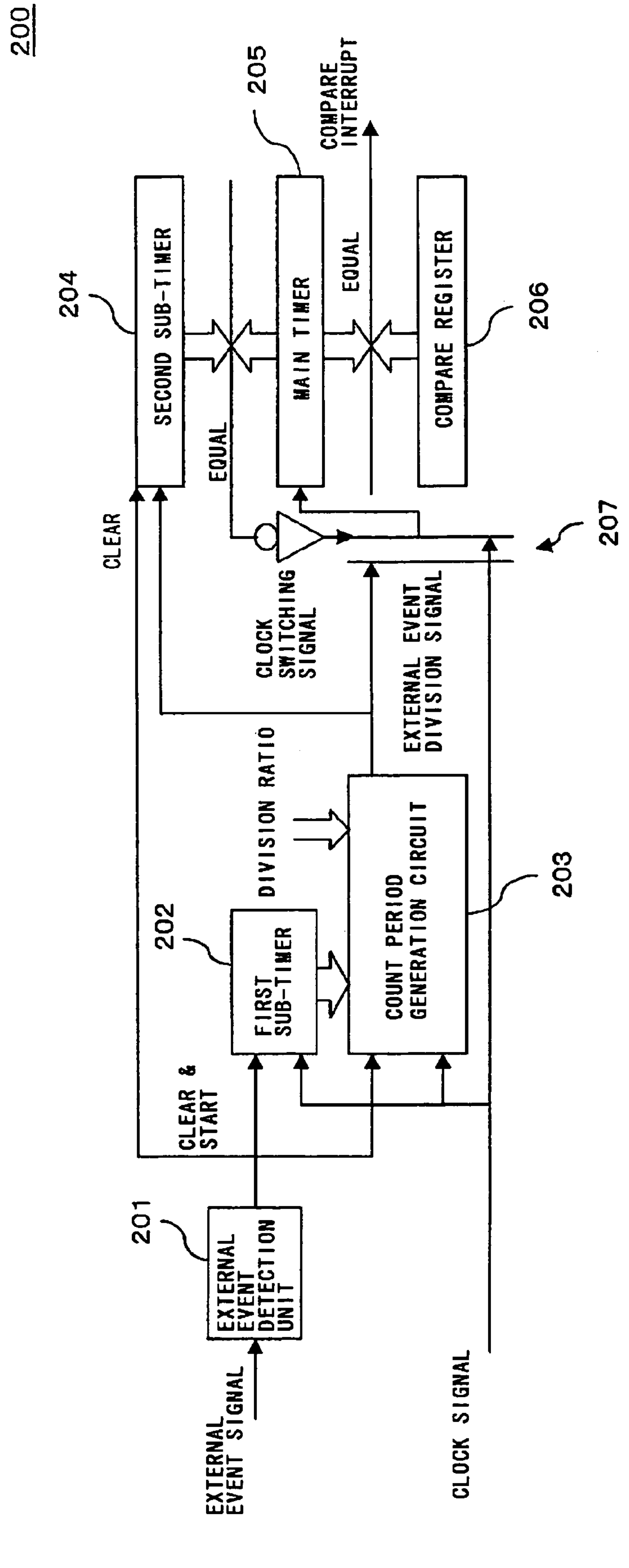
FIG. 3 PRIOR ART
FIG. 3 is a block diagram showing the configuration of a conventional interrupt generation circuit.
Figure 4:
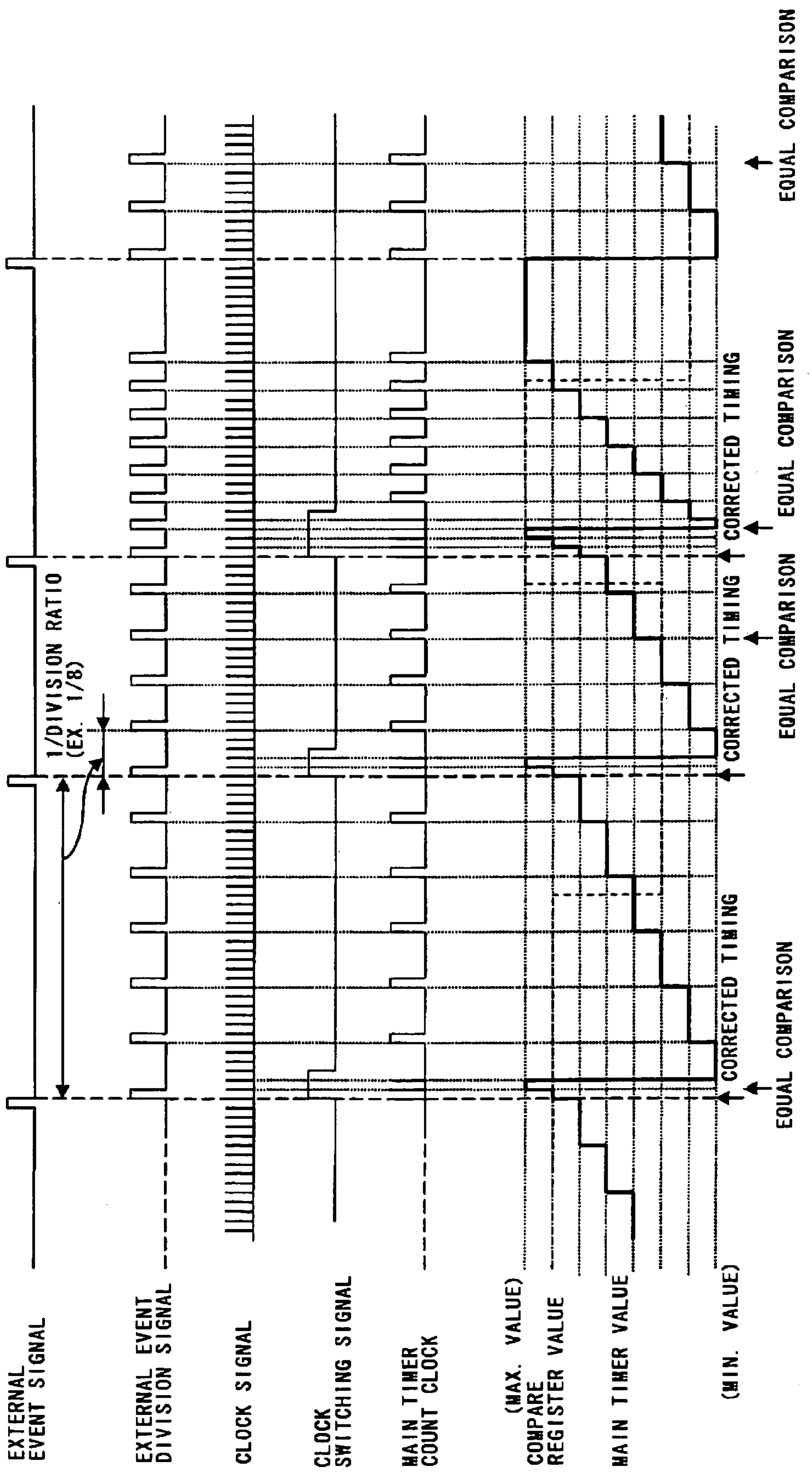
FIG. 4 PRIOR ART
FIG. 4 is a timing chart showing the operation of the components of the conventional interrupt generation circuit.

FIG. 2 is a timing chart showing the operation of the components of the interrupt generation circuit shown in FIG. 1. The following describes the operation of the interrupt generation circuit 100 in detail with reference to FIG. 1 and FIG. 2. In this embodiment, the interrupt generation circuit 100 receives a signal from a crank sensor, which generates a pulse each time the crank angle advances 30 degrees, as the external event signal and generates an interrupt when the crank angle is estimated to reach a desired angle.

In FIG. 2, the first pulse P1 of the external event signal corresponds to a crank angle of 30 degrees, and the next pulse P2 corresponds to the crank angle of 60 degrees. The external event detection unit 101 detects the effective edge (falling edge in the example in the FIG. 2) of the pulse of the external event signal. The periods from the effective edge of one external event signal to the effective edge of the next external event signal are indicated as external event periods T1, T2, T3, and so on, respectively. The rotation angle of the crank advances from 30 degrees to 60 degrees in external event period T1, from 60 degrees to 90 degrees in external event period T2, and from 90 degrees to 120 degrees in external event period T3.

The sub-timer 102 counts clock signals from the moment the effective edge of the external event signal is detected by the external event detection unit 101 to the moment the effective edge of the next external event signal is detected. The count value (timer value) stored in the sub-timer 102 when the effective edge of the external event signal is detected indicates the time interval of the external event period.

When the external event detection unit 101 detects the effective edge of the external event signal, the count period generation circuit 103 generates an external event division signal, whose period is 1/N of the effective edge period and which is composed of N pulses, from the received clock signal, based on the timer value of the sub-timer 102 at that time and a pre-set division ratio of 1/N. For example, in external event period T1, the count period generation circuit 103 generates an external event division signal with a period of ⅛ of the time interval of the external event period that has elapsed before the pulse P1 of the external event signal is generated.

When the external event detection unit 101 detects the effective edge, the main timer 104 clears its counter value and starts counting the external event division signals generated by the count period generation circuit 103. The count value of the main timer 104 indicates the resolution of the crank angle of 30 degrees that increments during one external event period. Because the period of the external event division signal counted by the main timer 104 is ⅛ of the time interval of the immediately preceding external event period, the count value of the main timer 104 corresponds to the advance of the crank angle estimated based on the immediately preceding external event period. When the count value of the main timer 104 is 4, the crank angle is estimated to advance 15 degrees ($30\times(4/8)$ degrees) from the time at which the pulse of the external event signal is generated.

The compare register 105 stores a value corresponding to the crank angle at which an interrupt is to be generated. The compare enable signal is controlled in such a way that it goes high when the count value of the main timer 104 is smaller than the value stored in the compare register 105 and goes low when the count value of the main timer 104 is equal to or larger than the value stored in the compare register 105.

The interrupt determination circuit 106 compares the count value of the main timer 104 with the value stored in the compare register 105 when the compare enable signal is high and, if the count value of the main timer 104 that is increased becomes equal to or larger than the value stored in the compare register 105, generates an interrupt. When the external event detection unit 101 detects the next effective edge of the external event signal, the compare enable signal is forced high.

Referring to FIG. 2, the count value of the main timer 104 is smaller than the value stored in the compare register 105 at first in the external event period T1, and thus the compare enable signal is high. When the value stored in the compare register 105 is changed after the third pulse of the external event division signal is output, the count value of the main timer 104 becomes larger than the changed value stored in the compare register 105 and therefore the compare enable signal goes low. Thus, in external event period T1, the interrupt generation requirement described above is not satisfied and the interrupt determination circuit 106 does not generate an interrupt at any point.

When the external event detection unit 101 detects the effective edge of the next pulse P2 of the external event signal indicating that the crank angle advances to 60 degrees, the main timer 104 clears the count value and the compare enable signal goes from low to high. The count period generation circuit 103 generates the external event division signal, whose period is ⅛ of the time interval of external event period T1, based on the count value of the sub-timer 102 at that time (detection of P2) and the division ratio 1/N.

In external event period T1, the count value of the main timer 104 at the end of the period is smaller than the maximum value. This means that the time interval of external event period T1 is narrower than that (T0) of the immediately preceding period, that is, the time required for the crank angle to advance from 30 degrees to 60 degrees is shorter than the time (T0) required to advance from 0 degree to 30 degrees. In other words, this means that the crank rotation is in the acceleration. Therefore, the period of the external event division signal generated by the count period generation circuit 103 in the next external event period T2 is set shorter than the period of the external event division signal generated in external event period T1.

In external event period T2, it is requested that an interrupt be generated when the crank angle is about (60+5) degrees and when the crank angle is about (60+28) degrees. In the example in FIG. 2, a value corresponding to the crank angle of about 5 degrees is stored in advance in the compare register 105 in external event period T1. When the count value of the main timer 104 is incremented by the third pulse of the external event division signal during external event period T2, the count value of the main timer 104 exceeds the value stored in the compare register 105. Since the compare enable signal is high at this instance, the interrupt determination circuit 106 generates an interrupt when the main timer 104 is incremented.

After the interrupt determination circuit 106 generates an interrupt, the count value of the main timer 104 becomes larger than the value stored in the compare register 105 and, therefore, the compare enable signal goes low. This prevents the interrupt determination circuit 106 from generating an interrupt even if the main timer 104 is incremented by the fourth pulse of the external event division signal. After the interrupt is generated and the fifth pulse of the external event division signal is output, the value stored in the compare register 105 is updated to a value corresponding to the crank angle of about 28 degrees at which the next interrupt is to be generated. Because the value stored in the compare register 105 is updated and the count value of the main timer 104 becomes smaller than the updated value in the compare register 105, the compare enable signal goes high.

In FIG. 2, before the count value of the main timer 104 reaches the value stored in the compare register 105 and when the compare enable signal is high before the count value reaches the maximum value, the external event detection unit 101 detects the effective edge of the third pulse P3 of the external event signal. This indicates in fact that, though the crank angle estimated based on the count value of the main timer 104 does not yet reach the crank angle at which an interrupt is to be generated in the external event period T2, the crank angle has already passed the crank angle at which the interrupt is to be generated and has reached 90 degrees.

If the count value of the main timer 104 is incremented to the maximum value in external event period T2, there is a crank angle at which an interrupt should be generated. Therefore, if the compare enable signal is high when the external event detection unit 101 detects the effective edge of the external event signal, the interrupt determination circuit 106 generates an interrupt immediately even if the count value of the main timer 104 is smaller than the value stored in the compare register 105.

On the other hand, also in external event period T1, the pulse P2 of the next external event signal is generated before the count value of the main timer 104 is incremented to the maximum value as in the case of external event period T2. However, the value stored in the compare register 105 is smaller than the count value in the main timer 104 and the compare enable signal is low. This means that there is no crank angle at which an interrupt should be generated even if the count value of the main timer 104 is incremented to the maximum value. Therefore, when the compare enable signal is low, the interrupt determination circuit 106 does not generate an interrupt when the external event detection unit 101 detects the effective edge of the pulse P2 of the external event signal.

In external event period T3, the main timer 104 clears the count value when the effective edge of the third pulse P3 of the external event signal is detected, and starts counting the external event division signals. In the example shown in FIG. 2, there is no crank angle at which an interrupt is to be generated in external event period T3. In addition, because the time interval of external event period T3 is wider than that of the external event period T2, the main timer 104 counts all N pulses of the external event division signal (that is, reaches the maximum value) output by the count period generation circuit 103 and, then, waits for the effective edge of the next pulse P4 of the external event signal to be detected. The value stored in the compare register 105 is updated by the value corresponding to the crank angle of about 4 degrees in external event period T3. In external event period T4, the interrupt determination circuit 106 generates an interrupt when the count value of the main timer 104 becomes equal to or larger than the value stored in the compare register 105.

In this embodiment, when the effective edge of a pulse of the external event signal is detected while the compare enable signal is high, the interrupt determination circuit 106 immediately generates an interrupt even if the count value of the main timer 104 is not equal to or larger than the value stored in the compare register 105. Actually however, when the effective edge of the external event signal is detected in this case, the crank angle has already passed the rotation angle at which an interrupt to be generated. If such a condition occurs, an interrupt is generated in this embodiment when the effective edge of the external event signal is detected and, therefore, the time difference between the moment the crank angle reaches the rotation angle at which an interrupt is to be generated and the moment the interrupt is actually generated can be minimized.

It is also possible to vary the division ratio 1/N of the count period generation circuit 103 according to the time interval of the immediately preceding external event period to allow the main timer 104 to change an increment in the count value according to N when counting pulses of the external event division signal, one pulse at a time. For example, when the time interval of the immediately preceding external event period is wide, N can be increased to increase the number of pulses that are output during one external event division period. Conversely, in case where the time interval of the immediately preceding external event period is narrow, N can be decreased to decrease the number of pulses that are output in the external event division period.

Although, in the above embodiment, the main timer 104 counts the pulse signals whose period depends on the time interval of the immediately preceding external event period, the present invention is not limited to this period of the signal. For example, it is also possible to set the period of the signal, counted by the main timer 104, to a period according to the average of the time intervals of a plurality of external event periods.

Although the present invention has been described in its preferred embodiment, the interrupt generation circuit according to the present invention is not limited only to the above embodiment. It is to be understood that various changes and the modifications of the configuration of the above embodiment are also included in the scope of the present invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An interrupt generation circuit comprising:

an edge detection unit that receives a periodic external signal from a monitored object and, upon detecting an effective edge of the external signal, generates an edge detection signal;

a main timer for implementing a count value for counting a plurality of pulses of a pulse signal and, when the edge detection signal is generated, for clearing the count value;

and an interrupt determination circuit that compares the count value of said main timer with a value stored in a compare register, in which a desired value is stored, for determining whether an interrupt of one or more interrupts is to be generated based on a result of the comparison, wherein, when the edge detection signal is generated, said interrupt determination circuit generates the interrupt at a timing when the edge detection signal is generated if the count value of said main timer is smaller than the value stored in said compare register, wherein the pulses of the pulse signal counted by the count value between the detection of the effective edge of the external signal and a detection of a following effective edge of the external signal are of a uniform pulse width such that the count value of the main timer is incremented at a uniform rate;

wherein the count value implemented by the main timer is for counting the pulses of the pulse signal and is not for counting pulses of signals other than the pulse signal.

2. The interrupt generation circuit as defined by claim 1 wherein said interrupt determination circuit generates a second interrupt of the one or more interrupts when the count value of said main timer becomes equal to or larger than the value stored in said compare register if a compare enable signal is active, said compare enable signal being activated when the count value of said main timer is smaller than the value stored in said compare register, said compare enable signal being deactivated when the count value of said main timer is equal to or larger than the value stored in said compare register.

3. The interrupt generation circuit as defined by claim 1, further comprising:

a sub-timer that measures a time interval between a time when the edge detection signal is generated and a time when a next edge detection signal is generated; and a count signal generation circuit that generates the pulse signal and, when the edge detection signal is generated, sets a period of the pulse signal based on the time interval between the effective edges measured by said sub-timer and on a division ratio 1/N where N represents an integer equal to or larger than 2.

4. The interrupt generation circuit as defined by claim 3 wherein the division ratio 1/N is set according to the time interval between the effective edges measured by said sub-timer.

5. The interrupt generation circuit as defined by claim 2, further comprising:

a sub-timer that measures a time interval between a time when the edge detection signal is generated and a time when a next edge detection signal is generated; and a count signal generation circuit that generates the pulse signal and, when the edge detection signal is generated, sets a period of the pulse signal based on the time interval between the effective edges measured by said sub-timer and on a division ratio 1/N where N represents an integer equal to or larger than 2.

6. The interrupt generation circuit as defined by claim 5 wherein the division ratio 1/N is set according to the time interval between the effective edges measured by said sub-timer.

7. The interrupt generation circuit as defined by claim 4, wherein N is increased if the time interval between the effective edges measured by said sub-timer is longer with respect to a preceding time interval, the preceding time interval being defined by the effective edge of the external signal and a preceding effective edge of the external signal.

8. The interrupt generation circuit as defined by claim 4, wherein N is decreased if the time interval between the effective edges measured by said sub-timer is shorter with respect to a preceding time interval, the preceding time interval being defined by the effective edge of the external signal and a preceding effective edge of the external signal.

9. The interrupt generation circuit as defined by claim 4, wherein the division ratio 1/N is set according to an average length of a plurality of preceding time intervals, the preceding time intervals being defined by a plurality of preceding effective edges of the external signal.

10. An interrupt generation circuit comprising:

means for receiving a periodic external signal and, upon detecting an effective edge of the external signal, for generating an edge detection signal;

means for implementing a counter for counting a plurality of pulses of a pulse signal and, upon the generation of the edge detection signal, for clearing the counter;

means for comparing the counter with a value stored in a compare register and for determining whether an interrupt of one or more interrupts is to be generated based on a result of the comparison;

and means for generating the one or more interrupts, wherein the means for generating the one or more interrupts generates the interrupt when the edge detection signal is generated if the counter is less than the value stored in said compare register, and wherein the pulses of the pulse signal counted by the counter between the detection of the effective edge of the external signal and a detection of a following effective edge of the external signal are of a uniform pulse width such that the counter is incremented at a uniform rate;

wherein the count value implemented by the means for implementing is for counting the pulses of the pulse signal and is not for counting pulses of signals other than the pulse signal.

11. The interrupt generation circuit of claim 10, wherein the means for generating the one or more interrupts generates a second interrupt of the one or more interrupts when the counter transitions from being less than to being equal to or greater than the value stored in said compare register if a compare enable signal is active at said transition, said compare enable signal being activated when the counter is less than the value stored in said compare register, and said compare enable signal being deactivated when the counter is equal to or greater than the value stored in said compare register.

12. A method of generating one or more interrupts, the method comprising:

receiving a periodic external signal and, upon detecting an effective edge of the external signal, generating an edge detection signal;

implementing a counter for counting a plurality of pulses of a pulse signal and, upon the generation of the edge detection signal, clearing the counter;

comparing the counter with a value stored in a compare register;

determining whether an interrupt of the one or more interrupts is to be generated based on a result of the comparison;

and generating the interrupt when the edge detection signal is generated if the counter is less than the value stored in said compare register, wherein the pulses of the pulse signal counted by the counter between the detection of the effective edge of the external signal and a detection of a following effective edge of the external signal are of a uniform pulse width such that the counter is incremented at a uniform rate;

wherein the counter is for counting the pulses of the pulse signal is not for counting pulses of signals other than the pulse signal.

13. The method of claim 12, further comprising:

generating a second interrupt of the one or more interrupts when the counter transitions from being less than to being equal to or greater than the value stored in said compare register if a compare enable signal is active at said transition, said compare enable signal being activated when the counter is less than the value stored in said compare register, and said compare enable signal being deactivated when the counter is equal to or greater than the value stored in said compare register.

14. The interrupt generation circuit of claim 1, wherein the count value implemented by the main timer is for counting the pulses of the pulse signal and is not for counting pulses of signals other than the pulse signal.

15. The interrupt generation circuit of claim 10, wherein the count value implemented by the means for implementing is for counting the pulses of the pulse signal and is not for counting pulses of signals other than the pulse signal.

16. The method of claim 12, wherein the counter is for counting the pulses of the pulse signal is not for counting pulses of signals other than the pulse signal.

* * * * *